United States Patent
Gao et al.

(10) Patent No.: US 11,184,931 B2
(45) Date of Patent: Nov. 23, 2021

(54) METHODS AND APPARATUSES FOR TIMING ADVANCE ADJUSTMENT

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 16/608,620

(22) PCT Filed: Apr. 28, 2017

(86) PCT No.: PCT/CN2017/082482
§ 371 (c)(1),
(2) Date: Oct. 25, 2019

(87) PCT Pub. No.: WO2018/195945
PCT Pub. Date: Nov. 1, 2018

(65) Prior Publication Data
US 2021/0112599 A1 Apr. 15, 2021

(51) Int. Cl.
*H04W 4/00* (2018.01)
*H04W 74/08* (2009.01)
*H04W 56/00* (2009.01)

(52) U.S. Cl.
CPC ... *H04W 74/0833* (2013.01); *H04W 56/0005* (2013.01)

(58) Field of Classification Search
CPC ......... H04W 74/0833; H04W 56/0005; H04W 72/04
See application file for complete search history.

(56) References Cited

U.S. PATENT DOCUMENTS

| | | | | |
|---|---|---|---|---|
| 2011/0149885 A1* | 6/2011 | Bachu | | H04W 74/008 370/329 |
| 2015/0131426 A1* | 5/2015 | Wan | | H04J 13/16 370/203 |

(Continued)

FOREIGN PATENT DOCUMENTS

| | | |
|---|---|---|
| CN | 103298136 A | 9/2013 |
| JP | 2015-508971 A | 3/2015 |

(Continued)

OTHER PUBLICATIONS

Written Opinion (PCT/ISA/237) dated Jan. 25, 2018, issued by the International Searching Authority in counterpart International Patent Application No. PCT/CN2017/092482.

(Continued)

*Primary Examiner* — Siren Wei
(74) *Attorney, Agent, or Firm* — Sughrue Mion, PLLC

(57) ABSTRACT

Embodiments of the present disclosure relate to methods and devices for timing advance adjustment. In example embodiments, a method implemented in a network device is provided. According to the method, in response to receiving a Physical Random Access Channel (PRACH) sequence from a terminal device served by the network device, a first value indicating an adjustment of timing advance is determined based on the PRACH sequence and at least one value of subcarrier spacing. An indication of the first value is transmitted to the terminal device to enable the terminal device to adjust timing of uplink transmission.

12 Claims, 10 Drawing Sheets

(56) References Cited

U.S. PATENT DOCUMENTS

| | | | |
|---|---|---|---|
| 2016/0262182 A1 | 9/2016 | Yang et al. | |
| 2019/0124691 A1* | 4/2019 | Harada | H04W 72/08 |
| 2019/0306855 A1* | 10/2019 | Tiirola | H04W 72/0446 |
| 2020/0028726 A1* | 1/2020 | Karlsson | H04L 5/0048 |
| 2020/0163076 A1* | 5/2020 | Liu | H04W 72/02 |

FOREIGN PATENT DOCUMENTS

| | | |
|---|---|---|
| JP | 2015-530013 A | 10/2015 |
| WO | 2015/014395 A1 | 2/2015 |

OTHER PUBLICATIONS

Search Report (PCT/ISA/220, PCT/ISA/210) dated Jan. 25, 2018, issued by the International Searching Authority in counterpart International Patent Application No. PCT/CN2017/092482.

Office Action dated Dec. 1, 2020 in Japanese Application No. 2019-558352.

3GPP TS 36.133 V14.3.0, 3rd Generation Partnership Project; Technical Specification Group Radio Access Network; Evolved Universal Terrestrial Radio Access (E-UTRA); Requirements for support of radio resource management (Release 14), Mar. 2017 (2387 pages total).

Ericsson, "Timing advance for TDD NR", 3GPP TSG-RAN WG4 Meeting #80bis, R4-167639, Ljubljana, Slovenia, Oct. 10-14, 2016 (4 pages total).

\* cited by examiner

METHODS AND APPARATUSES FOR TIMING ADVANCE ADJUSTMENT

TECHNICAL FIELD

Embodiments of the present disclosure generally relate to the field of telecommunication, and in particular, to methods and apparatuses for timing advance adjustment.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multiple subcarrier spacing values and corresponding frame structures have been agreed in new radio access (NR) for different scenarios. Specifically, it has been agreed that, for Physical Random Access Channel (PRACH) and for Zadoff-Chu (ZC) sequence type, two sequence lengths with multiple subcarrier spacing values will be supported.

Conventionally, uplink transmission from a terminal device (for example, a user equipment) needs to be adjusted. Transmission of an uplink radio frame from a terminal device should start a period of time before the start of a corresponding downlink radio frame, such that time of reception of uplink signals from different terminal devices at the network device is aligned to ensure uplink orthogonality and reduce intra-cell interference. For example, upon reception of a timing advance command from a network device (for example, an eNB), the terminal device shall adjust its uplink transmission timing for Physical Uplink Control Channel (PUCCH), Physical Uplink Shared Channel (PUSCH) and/or Sounding Reference Signal (SRS). The timing advance command may indicate a timing advance value to adjust the timing of the uplink transmission. However, the timing advance value indicated by the timing advance command is typically based on a fixed time unit and a fixed value of subcarrier spacing for PRACH. This may not be suitable for the multiple subcarrier spacing values supported in NR.

SUMMARY

In general, example embodiments of the present disclosure provide methods and apparatuses for RS transmission.

In a first aspect, there is provided a method implemented in a network device. According to the method, in response to receiving a Physical Random Access Channel (PRACH) sequence from a terminal device served by the network device, a first value indicating an adjustment of timing advance is determined based on the PRACH sequence and at least one value of subcarrier spacing. An indication of the first value is transmitted to the terminal device to enable the terminal device to adjust timing of uplink transmission.

In a second aspect, there is provided a method implemented in a terminal device. According to the method, a Physical Random Access Channel (PRACH) sequence is transmitted to a network device. In response to receiving, from the network device, an indication of a first value indicating an adjustment of timing advance, the first value is obtained to adjust timing of uplink transmission, the first value being determined by the network device based on the PRACH sequence and at least one value of subcarrier spacing.

In a third aspect, there is provided a network device. The network device comprises a processor and a memory coupled to the processor. The memory stores instructions that when executed by the processor, cause the network device to performs actions. The actions comprise: in response to receiving a Physical Random Access Channel (PRACH) sequence from a terminal device served by the network device, determining, based on the PRACH sequence and at least one value of subcarrier spacing, a first value indicating an adjustment of timing advance; and transmitting to the terminal device an indication of the first value to enable the terminal device to adjust timing of uplink transmission.

In a fourth aspect, there is provided a terminal device. The terminal device comprises a processor and a memory coupled to the processor. The memory stores instructions that when executed by the processor, cause the network device to performs actions. The actions comprise: transmitting to a network device a Physical Random Access Channel (PRACH) sequence; and in response to receiving, from the network device, an indication of a first value indicating an adjustment of timing advance, obtaining the first value to adjust timing of uplink transmission, the first value being determined by the network device based on the PRACH sequence and at least one value of subcarrier spacing.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
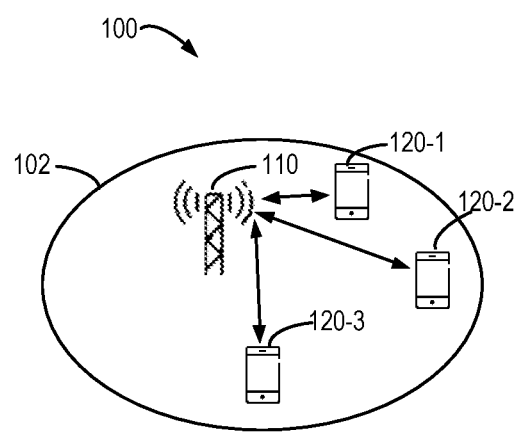
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1, 120-2 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

For initial access to the network device 110, the terminal device 120 may transmit a PRACH preamble sequence to the network device 110. Examples of the PRACH sequence may include but not limited to a Zadoff-Chu (ZC) sequence, or the like. The network device 110 may measure the uplink PRACH preamble sequence, and determine a timing advance value. The timing advance value may indicate that transmission of an uplink radio frame from the terminal device 120 should start a period of time before the start of a corresponding downlink radio frame. The network device 110 may carry a timing advance command in Random Access Response (RAR) to indicate the timing advance value. Upon reception of the timing advance command from the network device 110, the terminal device 120 shall adjust the timing of uplink transmissions for Physical Uplink Control Channel (PUCCH), Physical Uplink Shared Channel (PUSCH) and/or Sounding Reference Signal (SRS) based on the timing advance value.

In other cases rather than the initial access, a timing advance command may be transmitted from the network device 110 to the terminal device 120. The timing advance command may include a timing advance value indicating a change of the timing of uplink transmissions relative to the current timing of uplink transmissions. That is, the timing advance value included in the timing advance command may indicate an adjustment of the current timing advance value to a new timing advance value. Specifically, the timing advance value included in the periodic timing advance command could be a positive or negative amount which indicates advancing or delaying the timing of uplink transmissions by a corresponding amount respectively.

The timing advance value indicated by the network device 110 is usually based on a time unit (represented by $T_s$). The time unit $T_s$ may indicate a time interval between two adjacent samples in time domain. Therefore, the time unit $T_s$ can be determined as: $T_s=1/(S*N_{sample})$, where S may represent a value of subcarrier spacing and $N_{sample}$ may be a fixed value. For example, $N_{sample}$ may represent the number of samples in a period of time or Inverse Fast Fourier Transform (IFFT) size, such as the number of samples in one symbol or in one symbol without cyclic prefix (CP). For example, in LTE systems, the time unit $T_s$ is usually based on a fixed subcarrier spacing (for example, 15 kHz) and thus the time unit $T_s$ is also fixed (for example, $T_s=1/(15000 \times 2048)$ seconds). Further, in LTE systems, the timing advance value is a multiple of $16*T_s$. That is, the granularity for timing advance adjustment in LTE systems is $16*T_s$.

As described above, multiple subcarrier spacing values and corresponding frame structures have been agreed in NR for different scenarios. Specifically, it has been agreed that, for a ZC-based PRACH sequence, two sequence lengths with multiple subcarrier spacing values will be supported. For example, in NR, the PRACH sequence length may include 839, with a value of subcarrier spacing selected from {1.25, 2.5, 5} kHz. The PRACH sequence length may also include 63 or 71, with the value of subcarrier spacing selected from {15, 30, 60, 120, 240} kHz, or the PRACH sequence length may also include 127 or 139, with the value of subcarrier spacing selected from {7.5, 15, 30, 60, 120} kHz. Therefore, for example, the timing advance value based on a fixed time unit and a fixed value of subcarrier spacing may not be suitable for the multiple subcarrier spacing values supported in NR.

In order to solve the problems above and one or more of other potential problems, a solution for timing advance adjustment is provided in accordance with example embodiments of the present disclosure. With the solution, different granularities based on different values of subcarrier spacing can be provided. In addition, different subset of subcarrier spacing values and/or sequence lengths for PRACH in NR can be defined to be associated with different values of transmission subcarrier spacing and/or different use cases. Therefore, the solution in accordance with embodiments of the present disclosure can adjust timing of uplink transmissions more accurately.

Figure 2:
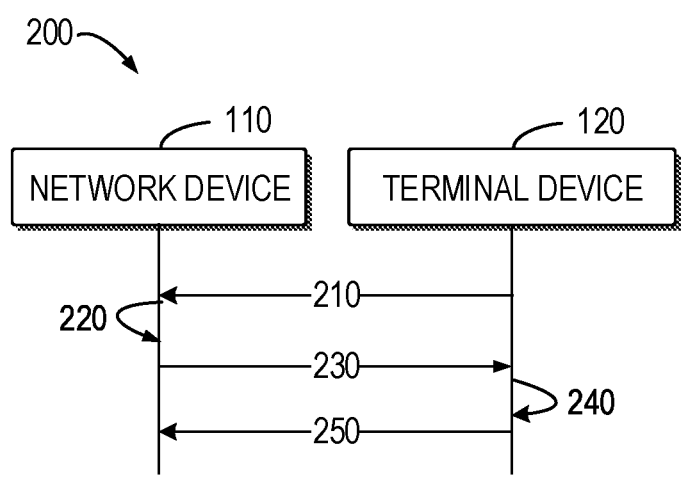
FIG. 2 is a flowchart illustrating a process for timing advance adjustment according to some embodiments of the present disclosure.

Principle and implementations of the present disclosure will be described in detail below with reference to FIG. 2, which shows a process 200 for timing advance adjustment according to some embodiments of the present disclosure.

For the purpose of discussion, the process 200 will be described with reference to FIG. 1. The process 200 may involve the network device 110 and one or more terminal devices 120 served by the network device 110.

The terminal device 120 transmits (210) a PRACH sequence to the network device 110. For example, examples of the PRACH sequence may include but not limited to a Zadoff-Chu (ZC) sequence, or the like. In one embodiment, the length of the PRACH sequence may be selected from {839, 71 or 63} or {839, 139 or 127}. Accordingly, a value of subcarrier spacing for PRACH transmission may be selected from {1.25, 2.5, 5, 15, 30, 60, 120, 240} kHz or {1.25, 2.5, 5, 7.5, 15, 30, 60, 120} kHz.

In response to receiving the PRACH sequence from the terminal device 120, the network device 110 determines (220), based on the PRACH sequence and at least one value of subcarrier spacing, a first value indicating an adjustment of time advance.

In one embodiment, the first value (represented by $T_A$) may be determined based on a time unit (represented by $T_s$ and also referred to as "a second value") indicating a time interval between two adjacent samples in time domain and a granularity parameter (represented by $N_t$) for timing advance adjustment. A product of $T_s$ and $N_t$ may define the granularity (also referred to as "a third value") for timing advance adjustment.

In one embodiment, the time unit $T_s$ may be determined based on a reference value of subcarrier spacing and a fixed value, where the reference value of subcarrier spacing may be represented by $S_r$. In one embodiment, the fixed value may be IFFT size or the number of samples in a period of time. For example, the fixed value may be the number of samples in one symbol or in one symbol without CP in time domain. If the fixed value is represented by $N_{sample}$, the time unit $T_s$ may be determined as: $T_s=1/(S_r*N_{sample})$.

In one embodiment, the reference value of subcarrier spacing $S_r$ may be determined based on a value indicating transmission subcarrier spacing (also referred to as "a fourth value"), such as a value of subcarrier spacing for downlink and/or uplink transmission. In one embodiment, the value of subcarrier spacing for downlink and/or uplink transmission may be represented by $S_t$, which may be included in a set of values of subcarrier spacing (also referred to as "a predetermined first set"). For example, the predetermined first set may be: {3.75, 15, 30, 60, 120, 240, 480} kHz or {15, 30, 60, 120, 240, 480} kHz. In one embodiment, the reference value of subcarrier spacing $S_r$ may be selected from a subset of the predetermined first set. Specifically, in one embodiment, the reference value of subcarrier spacing $S_r$ may be determined to be the value of transmission subcarrier spacing $S_t$. In another embodiment, the reference value of subcarrier spacing $S_r$ may be a fixed value. For example, the reference value may be one value from the set of values of subcarrier spacing (for example, the predetermined first set), such as 15 kHz, 120 kHz or 480 kHz.

In one embodiment, $N_{sample}$ may be a fixed value. For example, $N_{sample}$ may be IFFT size or the number of samples in a period of time. For example, the fixed value may be the number of samples in one symbol or in one symbol without CP in time domain.

In another embodiment, the value of $N_{sample}$ may be determined based on at least one value of subcarrier spacing or at least one value of number of subcarriers. For example, the value of $N_{sample}$ may be defined based on the system bandwidth, the number of subcarriers and/or the value of subcarrier spacing being supported. For example, the value of subcarrier spacing may be any of the following: the subcarrier spacing $S_t$ for downlink and/or uplink transmission, the subcarrier spacing $S_p$ for PRACH transmission, and the subcarrier spacing $S_r$ for reference.

In one embodiment, $N_{sample}$ may be defined to be a value equal to or greater than the number of subcarriers. For example, the value of $N_{sample}$ may be the minimum value of $2^n$, where $2^n$ is equal to or greater than the number of subcarriers. In one embodiment, the value of the number of subcarriers may be based on the value of subcarrier spacing and/or the system bandwidth under the value of subcarrier spacing. For example, the value of the number of subcarriers may be the number of subcarriers supported under the system bandwidth configured based on a value of subcarrier spacing. For another example, the value of the number of subcarriers may be the maximum number of subcarriers supported under the maximum system bandwidth being supported based on one value of subcarrier spacing. Specifically, in one embodiment, the value of $N_{sample}$ may be defined to be the minimum value of $2^n$, where $2^n$ is equal to or greater than the maximum number of subcarriers being supported. For example, if the maximum number of subcarriers being supported is represented by m, the value of n may be determined to be ceil($\log_2$ m).

In one embodiment, a set of values of subcarrier spacing may be predefined for any of the following purposes: for downlink and/or uplink transmission, for PRACH transmission and for reference. In another embodiment, subsets of values of subcarrier spacing may be selected from the predefined set of values of subcarrier spacing. For example, the subsets may be at least partially overlapped or separated from one another, or the subsets may be contiguous or discontinuous in the predefined set of values of subcarrier spacing. For example, each subset may include one or more values from the predefined set of values of subcarrier spacing. For each of the subsets of the values of subcarrier spacing, the value of $N_{sample}$ may be fixed. For example, for different subsets of the values of subcarrier spacing, the values of $N_{sample}$ may be different. In another embodiment, the values of $N_{sample}$ may be different for different values of subcarrier spacing in the predefined set.

Figure 3A:
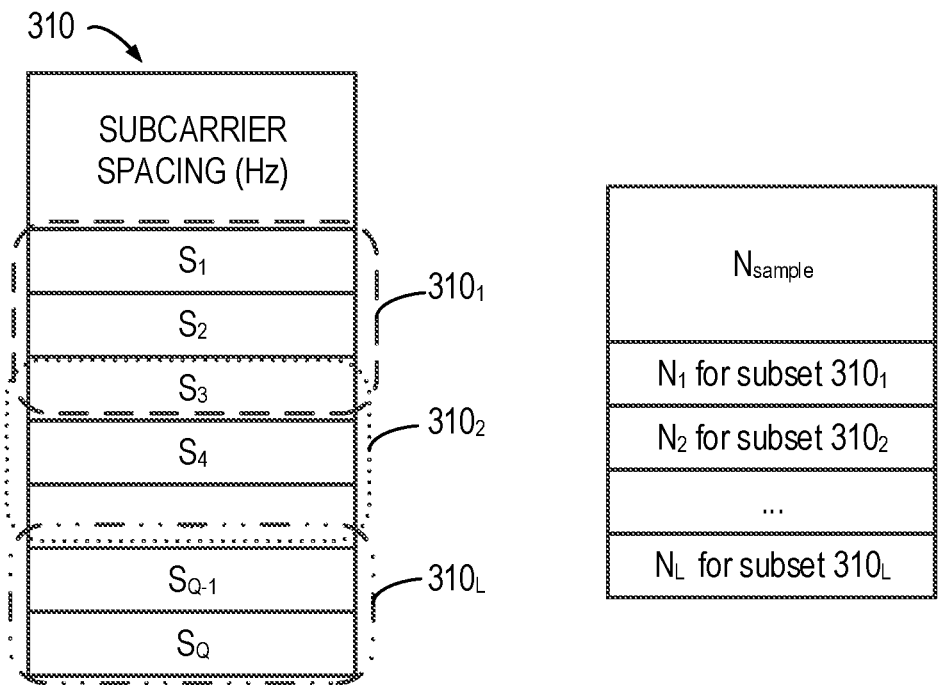
FIG. 3A shows an example of determining the value of $N_{sample}$ according to an embodiment of the present disclosure.

FIG. 3A shows an example of determining the value of $N_{sample}$ based on the predefined set of values of subcarrier spacing according to an embodiment of the present disclosure. As shown in FIG. 3A, a set of values of subcarrier spacing 310 may be predefined for any of the following purposes: for downlink and/or uplink transmission, for PRACH transmission and for reference. As shown, the predefined set 310 may be: $\{S_1, S_2, S_3, S_4 \ldots, S_{Q-1}, S_Q\}$ Hz, where Q is an integer and Q≥1. The predefined set 310 may be divided into L subsets (L≥1). For the $j^{th}$ subset $310_j$, the value of $N_{sample}$ may be fixed to be $N_j$, where j is an index of a subset and j=1, 2 ... L. In another embodiment, the set of values of subcarrier spacing (for example, the set 310) may not be divided into subsets or L=1. In this case, the value of $N_{sample}$ may be fixed to a single value. In another embodiment, the value $N_{sample}$ may be fixed to a respective value for each of the values of subcarrier spacing in the set.

In one embodiment, the granularity parameter $N_t$ may be determined based on a first value of subcarrier spacing $S_A$ and a second value of subcarrier spacing $S_B$. In one embodiment, the first value $S_A$ may include a value indicating subcarrier spacing for PRACH transmission (represented by $S_p$ and also referred to as "a fifth value"), and the value $S_B$ may include the value of transmission subcarrier spacing $S_t$. In one embodiment, the value $S_p$ may be included in a set of values of subcarrier spacing (also referred to as "a predetermined second set"). For example, in NR, the predetermined second set may be: $\{1.25, 2.5, 5, 15, 30, 60, 120, 240\}$ kHz, or $\{1.25, 2.5, 5, 7.5, 15, 30, 60, 120\}$ kHz.

In one embodiment, upon determining the first and second values of subcarrier spacing $S_A$ and $S_B$, the granularity parameter $N_t$ may be determined as: $N_t = S_B/S_A$. Then, the granularity for timing advance adjustment may be determined to be $(S_B/S_A)*T_s$. In this case, the first value $T_A$ indicating the adjustment of time advance may be determined to be a multiple of $(S_B/S_A)*T_s$.

In another embodiment, upon determining the first and second values of subcarrier spacing $S_A$ and $S_B$, the granularity parameter $N_t$ may be determined as: $N_t = \max(S_B/S_A, 1)$. Then, the granularity for timing advance adjustment may be determined to be $\max(S_B/S_A, 1)*T_s$. In this case, the first value $T_A$ indicating the adjustment of time advance may be determined to be a multiple of $\max(S_B/S_A, 1)*T_s$.

In one embodiment, the first and second values of subcarrier spacing $S_A$ and $S_B$ for determining the granularity parameter $N_t$ and the reference value of subcarrier spacing $S_r$ may be independent from each other. For example, in some cases, the reference value of subcarrier spacing $S_r$ may be same as the value of transmission subcarrier spacing $S_t$, and then the time unit $T_s$ can be determined based on the value of transmission subcarrier spacing $S_t$. That is, $T_s = 1/(S_t*N_{sample})$. The granularity for timing advance adjustment may be determined to be $(S_B/S_A)*T_s$ or $\max(S_B/S_A, 1)*T_s$.

In one embodiment, for a given second value of subcarrier spacing $S_B$, the first value of subcarrier spacing $S_A$ may not be greater than the given second value of subcarrier spacing $S_B$, so the granularity for timing advance adjustment may be determined to be $(S_B/S_A)*T_s$. In this case, the first value $T_A$ indicating the adjustment of time advance may be determined to be a multiple of $(S_B/S_A)*T_s$.

In one embodiment, the second value of subcarrier spacing $S_B$ may include the value of transmission subcarrier spacing $S_t$ for downlink and/or uplink transmission, and the first value of subcarrier spacing $S_A$ may include the value of subcarrier spacing $S_p$ for PRACH transmission. In this case, for a given value of transmission subcarrier spacing $S_t$, the value of subcarrier spacing for PRACH transmission $S_p$ may not be greater than the given value of transmission subcarrier spacing, so the granularity for timing advance adjustment may be determined to be $(S_t/S_p)*T_s$. In this case, the first value $T_A$ indicating the adjustment of time advance may be determined to be a multiple of $(S_t/S_p)*T_s$. In another embodiment, the time unit $T_s$ may be determined based on the value of subcarrier spacing for PRACH transmission $S_p$. That is, $T_s = 1/(S_p*N_{sample})$. The granularity for timing advance adjustment may be determined to be $(S_B/S_A)*T_s$.

Figure 3B:
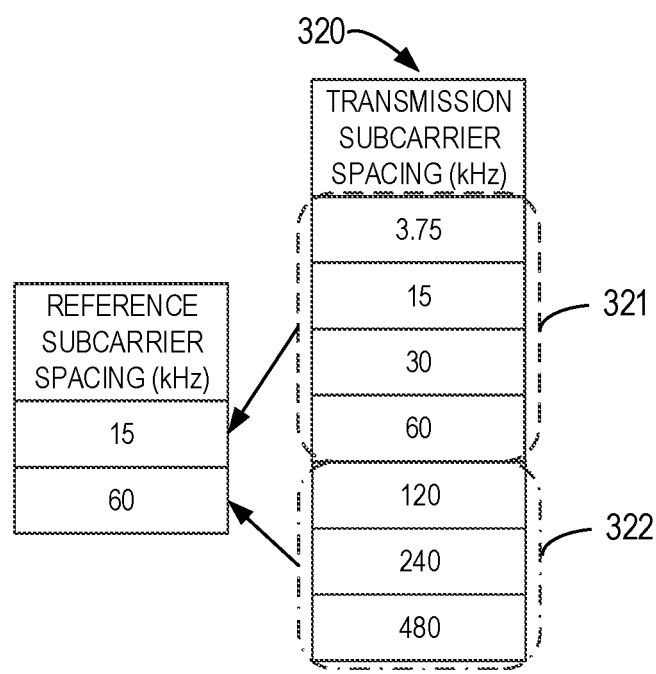
FIG. 3B-3C show examples of determining the reference value of subcarrier spacing according to some embodiments of the present disclosure.

In one embodiment, the predetermined first set of values of transmission subcarrier spacing (for example, $\{3.75, 15, 30, 60, 120, 240, 480\}$ kHz or $\{15, 30, 60, 120, 240, 480\}$kHz) may be divided into a first plurality of subsets. For example, the first plurality of subsets may be at least partially overlapped or separated from one another. The first plurality of subsets may be contiguous or discontinuous in the predetermined first set. In one embodiment, for each of the first plurality of subsets, a respective reference value $S_r$ may be configured. FIG. 3B shows an example of determining the reference value based on the first plurality of subsets according to an embodiment of the present disclosure. As shown in FIG. 3B, the predetermined first set 320 may be divided into two subsets 321 and 322. For the subset 321 (for example, $\{3.75, 15, 30, 60\}$ kHz), the reference value $S_r$ may be fixed to be 15 kHz. For the subset 322 (for example, $\{120, 240, 480\}$ kHz), the reference value $S_r$ may be fixed to be 60 kHz.

In one embodiment, the time unit $T_s$ may be determined based on the reference value. That is, $T_s=1/(S_r*N_{sample})$. For example, the number of $N_{sample}$ may be determined as described above according to an embodiment in the present disclosure. For another example, the number of $N_{sample}$ may be based on at least one of the following: the number of subcarriers, the reference value of subcarrier spacing, and the system bandwidth. For example, the number of subcarriers may be the number of subcarriers supported under the system bandwidth based on the reference value of subcarrier spacing. In one embodiment, the granularity for timing advance adjustment may be determined to be $(S_B/S_A)*T_s$ or $\max(S_B/S_A, 1)*T_s$. In another embodiment, for a given value of transmission subcarrier spacing $S_t$, the value of subcarrier spacing for PRACH transmission $S_p$ may not be greater than the given value of transmission subcarrier spacing, so the granularity for timing advance adjustment may be determined to be $(S_B/S_A)*T_s$. In this case, the first value $T_A$ indicating the adjustment of time advance may be determined to be a multiple of $(S_B/S_A)*T_s$.

In one embodiment, a set of values of subcarrier spacing (for example, $\{S_1, S_2, S_3, S_4 \ldots, S_{Q-1}, S_Q\}$ Hz, where Q is integer and $Q\geq 1$) may be predefined, for example for downlink and/or uplink transmission or for PRACH transmission. The predefined set of values may be divided into a plurality of subsets. For example, the plurality of subsets may be at least partially overlapped or separated from one another. For example, the plurality of subsets may be contiguous or discontinuous in the defined set of values of subcarrier spacing. For another example, each of the plurality of subsets may include only one value. That is, each of the values of subcarrier spacing in the defined set may be considered as one of the plurality of subsets. In one embodiment, for each of the plurality of subsets, a respective reference value of subcarrier spacing may be configured.

Figure 3C:
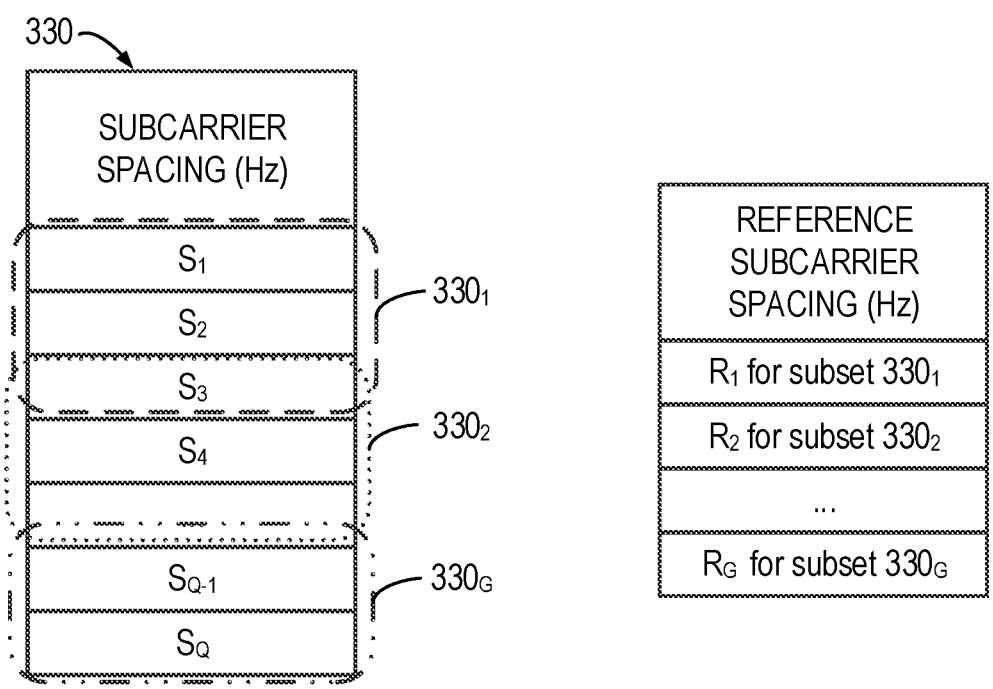

FIG. 3C shows an example of determining the reference value based on the predefined set of values of subcarrier spacing according to an embodiment of the present disclosure. As shown in FIG. 3C, a set of subcarrier spacing 330 may be predefined, for example for downlink and/or uplink transmission or for PRACH transmission. The predefined set 330 may be divided into G subsets ($G\geq 1$). For the $i^{th}$ subset 330$_i$, the reference value of subcarrier spacing $S_r$ may be fixed to be $R_i$, where i is an index of a subset and i= 1, 2 . . . G. For example, the value of $R_i$ may be any of the values of subcarrier spacing in the predefined set 330. In one embodiment, for each of the values in the predefined set 330, the reference value of subcarrier spacing $S_r$ may be fixed to the each of the values in the predefined set 330. That is, the reference value of subcarrier spacing $S_r$ may be same as each of the values in the predefined set 330 in different cases. In one embodiment, for a specific value of subcarrier spacing for transmission (for example, downlink and/or uplink transmission), no reference value of subcarrier spacing may be defined. In another embodiment, the reference value of subcarrier spacing $S_r$ may be one fixed value for all of possible values of subcarrier spacing for downlink and/or uplink transmission and/or PRACH transmission. For example, the fixed value of $S_r$ may be fixed to one value in the predefined set 330.

In one embodiment, the time unit $T_s$ may be determined based on the reference value. That is, $T_s=1/(S_r*N_{sample})$. For example, the number of $N_{sample}$ may be determined as described above according to an embodiment of the present disclosure. For another example, the number of $N_{sample}$ may be based on at least one of the following: the number of subcarriers, the reference value of subcarrier spacing and the system bandwidth. For example, the number of subcarriers may be the number of subcarriers supported under the system bandwidth based on the reference value of subcarrier spacing. In one embodiment, the granularity for timing advance adjustment may be determined to be $(S_B/S_A)*T_s$ or $\max(S_B/S_A, 1)*T_s$. In another embodiment, for a given value of transmission subcarrier spacing $S_t$, the value of subcarrier spacing for PRACH transmission $S_p$ may not be greater than the given value of transmission subcarrier spacing, so the granularity for timing advance adjustment may be determined to be $(S_B/S_A)*T_s$. In this case, the first value $T_A$ indicating the adjustment of time advance may be determined to be a multiple of $(S_B/S_A)*T_s$.

In one embodiment, the granularity parameter $N_t$ for timing advance adjustment may be fixed to different values in different cases. For example, in some cases, the granularity parameter $N_t$ may be fixed to a value $D_j$, and the granularity for timing advance adjustment may be determined to be $D_j*T_s$, where the value of $T_s$ may be defined according to an embodiment in present disclosure as described above. Specifically, in one embodiment, for example, the granularity for timing advance adjustment may be fixed to be 16, and the granularity for timing advance adjustment may be determined to be $16*T_s$.

Figure 4A:
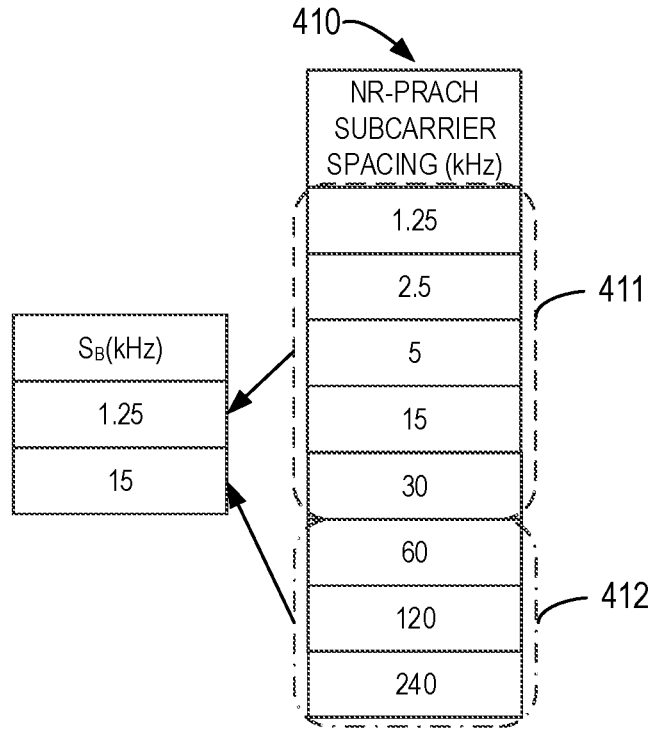
FIG. 4A-4B show examples of configuring the second value of subcarrier spacing $S_B$ based on the second plurality of subsets according to some embodiments of the present disclosure.

In one embodiment, the predetermined second set of values of subcarrier spacing for PRACH transmission (for example, $\{1.25, 2.5, 5, 15, 30, 60, 120, 240\}$ kHz, or $\{1.25, 2.5, 5, 7.5, 15, 30, 60, 120\}$ kHz) may be divided into a second plurality of subsets. For example, the second plurality of subsets may be at least partially overlapped or separated from one another. In one embodiment, the second value of subcarrier spacing $S_B$ may be fixed to a respective value associated with each of the second plurality of subsets. FIG. 4A shows an example of configuring the second value of subcarrier spacing $S_B$ based on the second plurality of subsets according to an embodiment of the present disclosure. As shown in FIG. 4A, the predetermined second set 410 may be: $\{1.25, 2.5, 5, 15, 30, 60, 120, 240\}$ kHz. The predetermined second set 410 may be divided into two subsets 411 and 412. For the subset 411 (for example, $\{1.25, 2.5, 5, 15, 30\}$ kHz), the second value of subcarrier spacing $S_B$ may be fixed to be 60 kHz. For the subset 412 (for example, $\{60, 120, 240\}$ kHz), the second value of subcarrier spacing $S_B$ may be fixed to be 480 kHz. In one embodiment, the granularity for timing advance adjustment may be determined to be $S_B/S_A*T_s$ or $\max(S_B/S_A, 1)*T_s$. In this case, the first value $T_A$ indicating the adjustment of time advance may be determined to be a multiple of $S_B/S_A*T_s$ or $\max(S_B/S_A, 1)*T_s$. In one embodiment, the second value of subcarrier spacing $S_B$ may be fixed to only one value for all of the values in the predetermined second set 410. The only one value may be selected from the predetermined first set (that is, the set of values of transmission subcarrier spacing), for example 480 kHz or 120 kHz. Then, the granularity parameter $N_t$ may be determined to be $S_B S_A$ and the granularity for timing advance adjustment may be determined to be $(S_B S_A)*T_s$. Specifically, in one embodiment, for example, the value of subcarrier spacing $S_t$ may be fixed to 480 kHz. Then, the granularity parameter $N_t$ may be determined to be $480K/S_A$ and the granularity for timing advance adjustment may be determined to be $480K/S_A*T_s$.

In one embodiment, for example, the predetermined second set of values of subcarrier spacing for PRACH transmission may be defined to be $\{P_1, P_2, P_3, P_4 \ldots, P_{N-1}, P_N\}$, where N is an integer and $N\geq 1$. In one embodiment, the predetermined second set may be divided into the second plurality of subsets. In one embodiment, the second plurality of subsets may be at least partially overlapped or separated from one another. For example, the second plurality of subsets may be contiguous or discontinuous in the predetermined second set. For example, each of the second plurality of subsets may include only one value. That is, each of the values in the predetermined second set may be considered as one of the second plurality of subsets.

Figure 4B:
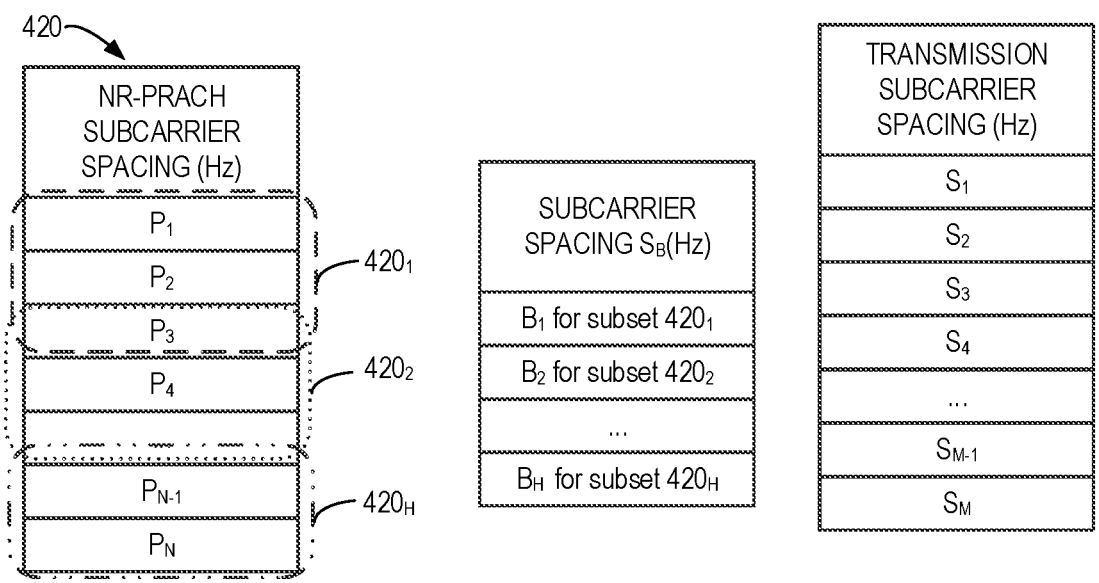

In one embodiment, for each of the second plurality of subsets, the second value of subcarrier spacing $S_B$ may be fixed. FIG. 4B shows an example of configuring the second value of subcarrier spacing $S_B$ based on the second plurality of subsets according to an embodiment of the present disclosure. As shown in FIG. 4B, the predetermined second set 420 of values of subcarrier spacing for PRACH transmission may be: $\{P_1, P_2, P_3, P_4 \ldots, P_{N-1}, P_N\}$, where N is an integer and N≥1. The predetermined second set 420 may be divided into H subsets (H≥1). For the $i^{th}$ subset $420_i$, the second value of subcarrier spacing $S_B$ may be fixed to be $B_i$, where i is an index of a subset and i=1, 2 ... H. For example, the value of $B_i$ may be selected from the predetermined first set. Specifically, in one embodiment, H may equal to N. That is, a respective value of $S_B$ may be fixed independently for each of the values in the predetermined second set. For example, the respective fixed value may be selected from the predetermined first set. In another embodiment, the second value of subcarrier spacing $S_B$ may be fixed to only one value for all of the values in the predetermined second set. For example, the only one value may be selected from the predetermined first set.

In one embodiment, the granularity for timing advance adjustment may be determined to be $S_B/S_p*T_s$ or $\max(S_B/S_p, 1)*T_s$. In this case, the first value $T_A$ indicating the adjustment of time advance may be determined to be a multiple of $S_B/S_p*T_s$ or $\max(S_B/S_p, 1)*T_s$. Specifically, in one embodiment, for example, the second value of subcarrier spacing $S_B$ may be fixed to 480 kHz. Then, the granularity parameter $N_t$ may be determined to be $480K/S_p$ and the granularity for timing advance adjustment may be determined to be $480K/S_p*T_s$.

Figure 5A:
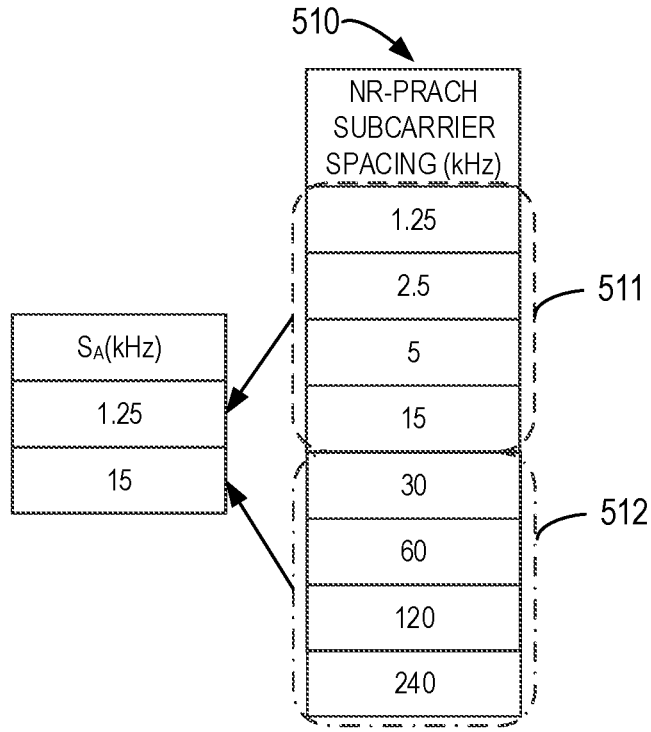
FIG. 5A-5B show examples of configuring the first value of subcarrier spacing $S_A$ based on the second plurality of subsets according to some embodiments of the present disclosure.

In one embodiment, the predetermined second set of values of subcarrier spacing for PRACH transmission (for example, {1.25, 2.5, 5, 15, 30, 60, 120, 240} kHz, or {1.25, 2.5, 5, 7.5, 15, 30, 60, 120} kHz) may be divided into the second plurality of subsets. For example, the second plurality of subsets may be at least partially overlapped or separated from one another. In one embodiment, for each of the second plurality of subsets, a respective value of subcarrier spacing for $S_A$ may be fixed. FIG. 5A shows an example of configuring different values of subcarrier spacing for $S_A$ based on the second plurality of subsets according to an embodiment of the present disclosure. As shown in FIG. 5A, the predetermined second set 510 of values of subcarrier spacing may be: {1.25, 2.5, 5, 15, 30, 60, 120, 240} kHz. The predetermined second set 510 may be divided into two subsets 511 and 512. For the subset 511 (for example, {1.25, 2.5, 5, 15} kHz), the respective value of subcarrier spacing for $S_A$ may be fixed to be 1.25 kHz. For the subset 512 (for example, {30, 60, 120, 240} kHz), the respective value of subcarrier spacing for $S_A$ may be fixed to be 15 kHz. The granularity for timing advance adjustment may be determined to be $(S_B/S_A)*T_s$. In this case, the first value $T_A$ indicating the adjustment of time advance may be determined to be a multiple of $(S_B/S_A)*T_s$. Specifically, in one embodiment, for the subset 511, the granularity parameter $N_t$ may be determined to be 12, and the granularity for timing advance adjustment may be determined to be $12*T_s$. In another embodiment, for the subset 512, the granularity parameter $N_t$ may be determined to be 16, and the granularity for timing advance adjustment may be determined to be $16*T_s$.

In one embodiment, for example, the predetermined second set of values of subcarrier spacing for PRACH transmission may be defined to be $\{P_1, P_2, P_3, P_4 \ldots, P_{N-1}, P_N\}$, where N is an integer and N≥1. In one embodiment, the predetermined second set may be divided into the second plurality of subsets. In one embodiment, the second plurality of subsets may be at least partially overlapped or separated from one another. For example, the second plurality of subsets may be contiguous or discontinuous in the predetermined second set.

Figure 5B:
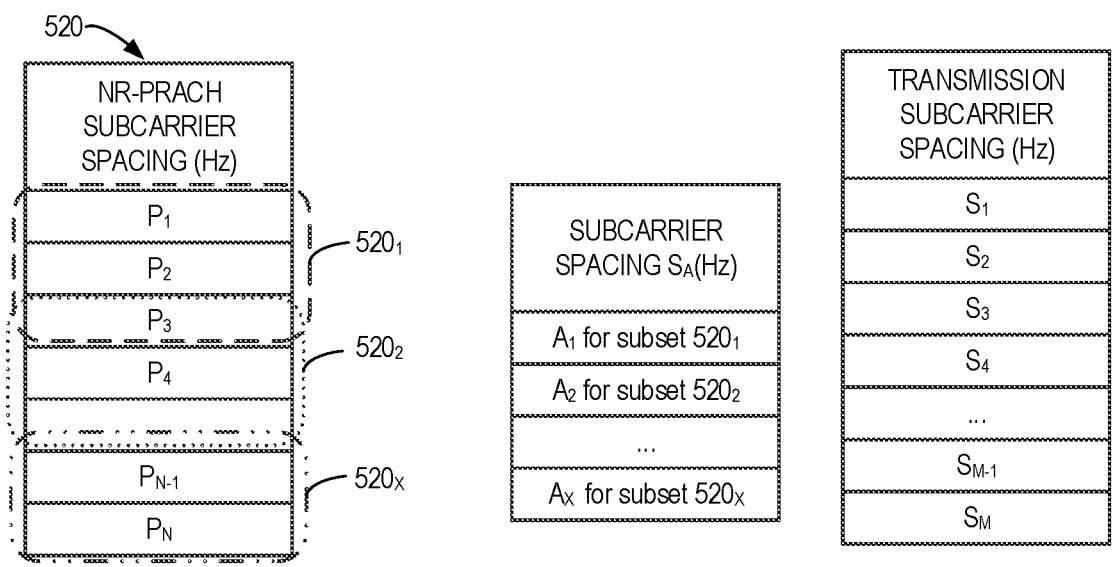

In one embodiment, for each of the second plurality of subsets, a value of subcarrier spacing for $S_A$ may be fixed. FIG. 5B shows an example of configuring different values of subcarrier spacing for $S_A$ based on the second plurality of subsets according to an embodiment of the present disclosure. As shown in FIG. 5B, the predetermined second set 520 of values of subcarrier spacing for PRACH transmission may be: $\{P_1, P_2, P_3, P_4 \ldots, P_{N-1}, P_N\}$, where N is an integer and N≥1. The predetermined second set 520 may be divided into X subsets (X≥1). For the $i^{th}$ subset $520_i$, the first value of subcarrier spacing $S_A$ may be fixed to be $A_i$, where i is an index of a subset and i=1, 2 ... X. For example, the values of $A_i$ may be selected from the predetermined second set. Specifically, in one embodiment, H may equal to N. In this case, a respective value of $S_A$ may be fixed to each of the values in the predetermined second set. That is, the first value of subcarrier spacing $S_A$ may be same as the configured value of subcarrier spacing for PRACH transmission. In another embodiment, the first value of subcarrier spacing $S_A$ may be fixed to only one value for all of the values in the predetermined second set. For example, the only one value may be selected from the predetermined first set.

In one embodiment, the granularity for timing advance adjustment may be determined to be $(S_B/S_A)*T_s$. In this case, the first value $T_A$ indicating the adjustment of time advance may be determined to be a multiple of $(S_B/S_A)*T_s$. In one embodiment, for the $i^{th}$ subset, the granularity parameter $N_t$ may be determined to be $C_i$, where $C_i$ may be a fixed positive integer, and the granularity for timing advance adjustment may be determined to be $C_i*T_s$. For example, $C_i$ may be any of the following: 1, 4, 8, 16, 32, and 64.

Referring back to FIG. 2, the network device 110 transmits (230) to the terminal device 120 an indication of the first value to enable the terminal device 120 to adjust timing of uplink transmission. In one embodiment, the network device 110 may transmits an index value $N_{TA}$ of the first value $T_A$ to the terminal device 120. In one embodiment, the network device 110 may indicate the index value NA to the terminal device 120, where $T_A=N_{TA}*T_s$. For example, the index value $N_{TA}$ is a multiple of the granularity parameter $N_t$.

In response to receiving, from the network device 110, the indication of the first value, the terminal device 120 obtains (240) the first value to adjust the timing of uplink transmission.

In one embodiment, the terminal device 120 may receive the index value $N_{TA}$ from the network device 110, and determines the first value $T_A$ based on the index value $N_{TA}$. In one embodiment, the first value $T_A$ may be determined based on the time unit $T_s$ indicating the time interval between two adjacent samples in time domain and the index value $N_{TA}$. For example, the first value $T_A$ can be determined as: $T_A=N_{TA}*T_s$. In one embodiment, the terminal device 120 may determine the time unit $T_s$ in the same way as the network device 110, as described above. For the purpose of simplification, the determining of the time unit $T_s$ by the terminal device 120 will not be further described in detail.

Upon obtaining the timing advance value indicated by the network device 110, the terminal device 120 may adjust (250) the timing of uplink transmission based on the timing advance value.

In one embodiment, for initial access to the network device 110, transmission of an uplink radio frame from the terminal device 120 may start a period of time before the start of a corresponding downlink radio frame. The period of time may be determined as: $(N_{TA}+N_{TA\_offset})*T_s$, where $N_{TA\_offset}$ is a fixed value. For example, for frame structure in Frequency Division Duplex (FDD), $N_{TA\_offset}$ may be 0, while for frame structure in Time Division Duplex (TDD), $N_{TA\_offset}$ may be W, where W is an integer and is a fixed value.

In one embodiment, for other cases rather than the initial access, the timing advance value (that is, the first value $T_A$) may indicate an adjustment of the current timing advance value to a new timing advance value. Specifically, the index for the new timing advance value $N_{TA\_new}$ may be determined as $N_{TA\_new}=N_{TA}+N_{TA\_old}$, where $N_{TA\_old}$ is the index of the current timing advance value. With the adjustment, transmission of an uplink radio frame from the terminal device 120 may start $(N_{TA\_new}*T_s)$ before the start of a corresponding downlink radio frame. In one embodiment, the timing advance value (that is, the first value $T_A$) may be positive or negative, which indicates advancing or delaying the timing of uplink transmissions by a corresponding amount respectively.

In one embodiment, the value $N_{TA}$ may be a multiple of the granularity parameter $N_t$. That is, $N_{TA}=K*N_t$, where K is an integer and K≥1. In one embodiment, for example for initial access, the value K may fall into a range (0, 1, 2, . . . , α). In another embodiment, for example for other cases except the initial access, the value K may fall into another range (0, 1, 2, . . . , β).

In one embodiment, the network device may indicate the value of K to the terminal device for timing advance adjustment. In one embodiment, for example for initial access, the number of bits for the indication of the value K may be Δ. In another embodiment, for example for other cases except the initial access, the number of bits for the indication of the value K may be σ.

In one embodiment, upon determining any of the first value of subcarrier spacing $S_A$, the second value of subcarrier spacing $S_B$ and the reference value of subcarrier spacing $S_r$ according to an embodiment of the present disclosure, the range of the value K and/or the number of bits for the indication of the value K may be determined based on any of the first value of subcarrier spacing $S_A$, the second value of subcarrier spacing $S_B$ and the reference value of subcarrier spacing $S_r$. For example, the value $K_1$ falling into a first range (0, 1, 2, . . . , $α_1$) may be associated with any of the first value of subcarrier spacing $S_{A1}$, the second value of subcarrier spacing $S_{B1}$ and the reference value of subcarrier spacing $S_{r1}$. The value $K_2$ falling into a second range (0, 1, 2, . . . , $α_2$) may be associated with any of the first value of subcarrier spacing $S_{A2}$, the second value of subcarrier spacing $S_{B2}$ and the reference value of subcarrier spacing $S_{r2}$. In one embodiment, different ranges of the value K (such as, the first and second ranges) may be used for a same case (for example, initial access or other cases). Alternatively, in another embodiment, different ranges of the value K may be used for different cases respectively.

In one embodiment, $Δ_1$ bits may be used for the indication of the value $K_1$ and $Δ_1$ may be associated with any of the first value of subcarrier spacing $S_{A1}$, the second value of subcarrier spacing $S_{B1}$ and the reference value of subcarrier spacing $S_{r1}$. $Δ_2$ bits may be used for the indication of the value $K_2$ and $Δ_2$ may be associated with any of the first value of subcarrier spacing $S_{A2}$, the second value of subcarrier spacing $S_{B2}$ and the reference value of subcarrier spacing $S_{r2}$. In one embodiment, different values of Δ (such as, $Δ_1$ and $Δ_2$) may be used for a same case (for example, initial access or other cases). Alternatively, in another embodiment, different values of Δ may be used for different cases respectively.

Figure 6A:
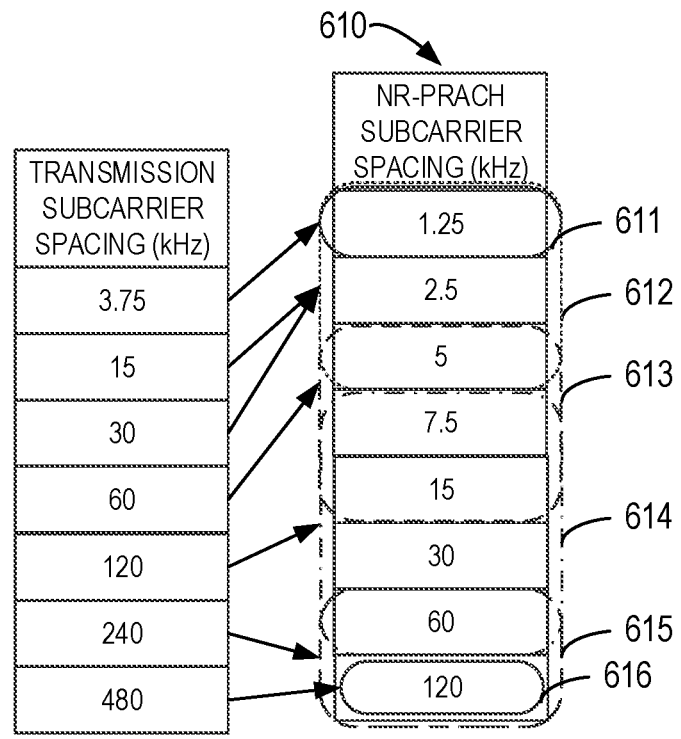
FIG. 6A-6B show examples of configuring different values of transmission subcarrier spacing based on the predetermined second set according to some embodiments of the present disclosure.

In some embodiments, different subsets of the predetermined second set of values of subcarrier spacing (for example, {1.25, 2.5, 5, 15, 30, 60, 120, 240} kHz, or {1.25, 2.5, 5, 7.5, 15, 30, 60, 120} kHz) may be associated with different values of transmission subcarrier spacing. FIG. 6A shows an example of configuring subsets of the predetermined second set to be used for one given value of subcarrier spacing for downlink and/or uplink transmission, based on the association between the predetermined first and second sets. As shown in FIG. 6A, the predetermined second set 610 of values of subcarrier spacing may be: {1.25, 2.5, 5, 7.5, 15, 30, 60, 120} kHz. Five subsets 611-616 of the predetermined second set 610 are shown, in which the subset 611 may be {1.25} kHz, the subset 612 may be {1.25, 2.5, 5} kHz, the subset 613 may be {5, 7.5, 15} kHz, the subset 614 may be {7.5, 15, 30, 60} kHz, the subset 615 may be {60, 120} kHz and the subset 616 may be {120} kHz. For each value in the predetermined first set (that is, the set of values of subcarrier spacing for downlink and/or uplink transmission), at least one of the subsets of the predetermined second set 610 may be configured. Examples of the subsets are shown as 611-615. For example, the subset 612 may be associated with 15 kHz subcarrier spacing for downlink and/or uplink transmission. That is, when the subcarrier spacing for downlink and/or uplink transmission is configured to be 15 kHz, any of the values in the subset 612 may be selected as the subcarrier spacing for PRACH transmission. Similarly, the subset 612 may also be associated with 30 kHz subcarrier spacing for downlink and/or uplink transmission. The subset 611 may be associated with 3.75 kHz subcarrier spacing for downlink and/or uplink transmission. The subset 613 may be associated with 60 kHz subcarrier spacing for downlink and/or uplink transmission. The subset 614 may be associated with 120 kHz subcarrier spacing for downlink and/or uplink transmission. The subset 615 may be associated with 240 kHz subcarrier spacing for downlink and/or uplink transmission. The subset 616 may be associated with 480 kHz subcarrier spacing for downlink and/or uplink transmission. It should be understood that the above examples are only for the purpose of illustration without suggesting any limitations to the scope of the present disclosure.

In one embodiment, a value may be selected from the predetermined second set to be used as the subcarrier spacing for PRACH transmission. For example, an indication of the value may be transmitted from the network device to the terminal device for configuring the value as the subcarrier spacing for PRACH transmission. In response to receiving the indication, the terminal device may transmit signals on PRACH with the subcarrier spacing corresponding to the indication. In one embodiment, the number of bits for the indication may be represented by Y. For example, Y may be 3 for indicating one of the 8 values in the predetermined second set for PRACH transmission (for example, {1.25, 2.5, 5, 15, 30, 60, 120, 240} kHz, or {1.25, 2.5, 5, 7.5, 15, 30, 60, 120} kHz).

In one embodiment, at least one subset of the predetermined second set (for example, {1.25, 2.5, 5, 15, 30, 60, 120, 240} kHz, or {1.25, 2.5, 5, 7.5, 15, 30, 60, 120}kHz) may be associated with the value of transmission subcarrier spacing $S_t$ (for example, for uplink and/or downlink transmission). In one embodiment, for the value of transmission subcarrier spacing $S_t$, the number of bits for indication of the value of subcarrier spacing for PRACH transmission from the at least one subset of the predetermined second set may be Z (Z≤Y). For example, the number of bits for indication of subsets may be 1 or 2.

In one embodiment, for example, the predetermined first set of values of subcarrier spacing for uplink and/or downlink transmission may be defined to be $\{S_1, S_2, S_3, S_4 \ldots, S_{M-1}, S_M\}$, where M is an integer and M≥1. In one embodiment, the predetermined first set may be divided into the first plurality of subsets. In one embodiment, the first plurality of subsets may be at least partially overlapped or separated from one another. For example, the first plurality of subsets may be contiguous or discontinuous in the predetermined first set. For example, the sizes of the first plurality of subsets may be different from or same as each other. For another example, each of the first plurality of subsets may include only one value. That is, each of the values in the predetermined first set may be considered as one of the first plurality of subsets. In another embodiment, the predetermined first set may not be divided.

In one embodiment, for example, the predetermined second set of values of subcarrier spacing for PRACH transmission may be defined to be $\{P_1, P_2, P_3, P_4 \ldots, P_{N-1}, P_N\}$, where N is an integer and N≥1. In one embodiment, the predetermined second set may be divided into the second plurality of subsets. In one embodiment, the second plurality of subsets may be at least partially overlapped or separated from one another. For example, the second plurality of subsets may be contiguous or discontinuous in the predetermined second set. For example, the sizes of the second plurality of subsets may be different from or same as each other. For another example, each of the second plurality of subsets may include only one value. That is, each of the values in the predetermined second set may be considered as one of the second plurality of subsets. In another embodiment, the predetermined second set may not be divided.

In one embodiment, at least one of the first plurality of subsets may be associated with at least one of the second plurality of subsets. In one embodiment, for values of transmission subcarrier spacing in the at least one of the first plurality of subsets, a value from the at least one of the second plurality of subsets may be configured as subcarrier spacing for PRACH transmission.

Figure 6B:
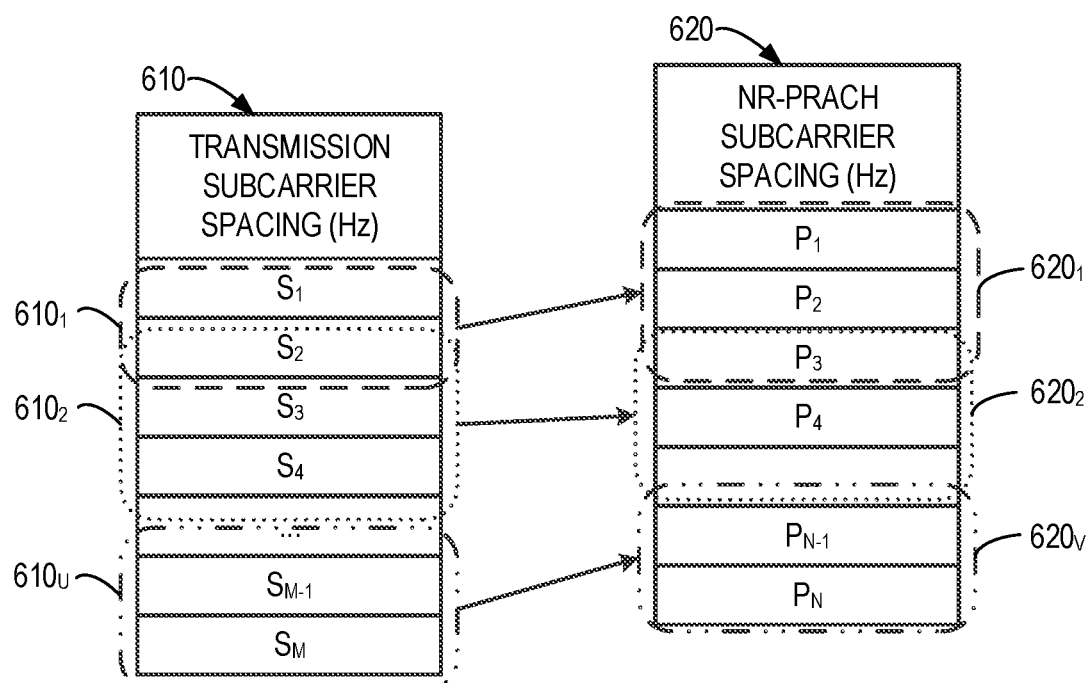

FIG. 6B shows an example of association between the at least one of the first plurality of subsets and the at least one of the second plurality of subsets. As shown in FIG. 6B, the predetermined first set 610 of values of transmission subcarrier spacing may be divided into U subsets (that are, the first plurality of subsets). The predetermined second set 620 of values of subcarrier spacing for PRACH transmission may be divided into V subsets (that are, the second plurality of subsets). Each of the first plurality of subsets may be associated with at least one of the second plurality of subsets. For example, as shown in FIG. 6B, a subset 610$_1$ in the first plurality of subsets may be associated with a subset 620$_1$ in the second plurality of subsets. That is, for any of the values in the subsets 610$_1$, any of the values in the subset 620$_1$ may be configured as the subcarrier spacing for PRACH transmission. Similarly, a subset 610$_2$ in the first plurality of subsets may be associated with a subset 620$_2$ in the second plurality of subsets; and a subset 610$_U$ in the first plurality of subsets may be associated with a subset 620$_V$ in the second plurality of subsets.

In one embodiment, the predetermined second set of values of subcarrier spacing for PRACH transmission may be defined to be $\{P_1, P_2, P_3, P_4 \ldots, P_{N-1}, P_N\}$, where N is an integer and N≥1. A value may be selected from the predetermined second set to be used as the subcarrier spacing for PRACH transmission. For example, an indication of the value may be transmitted from the network device to the terminal device for configuring the value as the subcarrier spacing for PRACH transmission. In response to receiving the indication, the terminal device may transmit signals on PRACH with the subcarrier spacing corresponding to the indication. In one embodiment, the number of bits for the indication may be represented by Y. In one embodiment, different subsets of the predetermined second set may be associated with different subsets or values of the predetermined first set. In one embodiment, for each value or subset of the predetermined first set, the number of bits for the indication of the value of subcarrier spacing for PRACH transmission from one of the subsets of the predetermined second set may be Z (Z≤Y).

Figure 7:
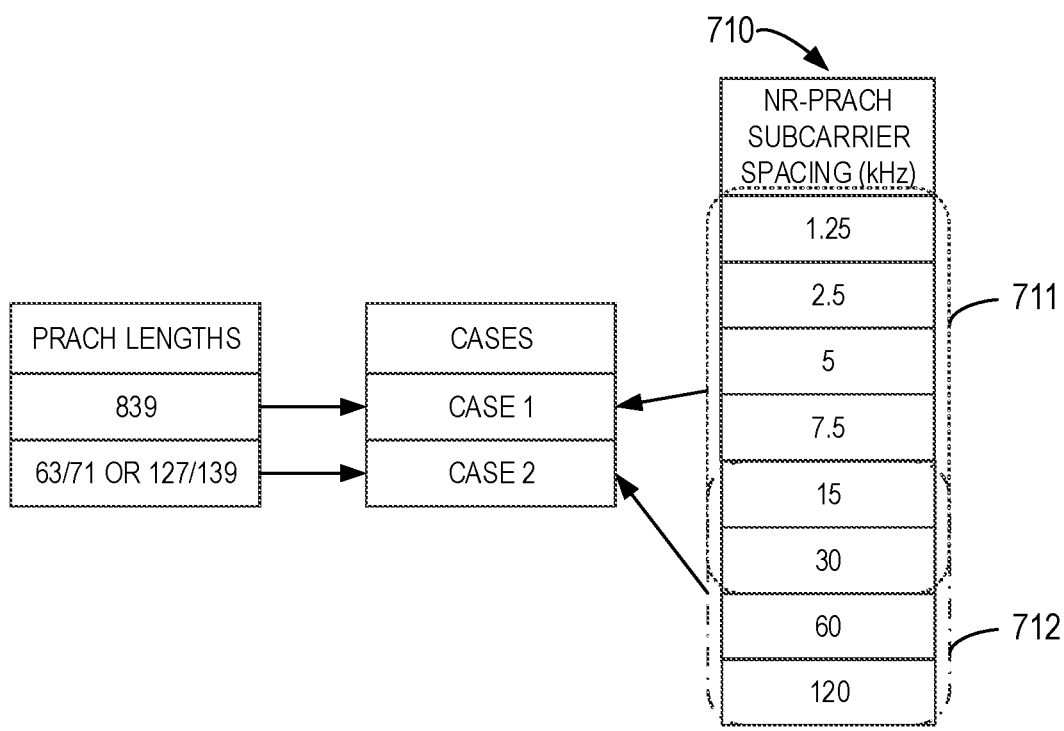
FIG. 7 shows an example of configuring different subsets of the predetermined second set of values of subcarrier spacing and/or different PRACH sequence lengths for different use cases according to an embodiment of the present disclosure.

In some embodiments, different subsets of the predetermined second set of values of subcarrier spacing (for example, {1.25, 2.5, 5, 15, 30, 60, 120, 240} kHz, or {1.25, 2.5, 5, 7.5, 15, 30, 60, 120} kHz) and/or different PRACH sequence lengths may be configured for different use cases. In one embodiment, the predetermined second set (that is, the set of values of subcarrier spacing for PRACH transmission) and/or a set of PRACH sequence lengths for PRACH transmission may be divided into a plurality of subsets. In one embodiment, the plurality of subsets of the predetermined second set and/or the set of PRACH sequence lengths may be at least partially overlapped or separated from one another. For example, the plurality of subsets may be contiguous or discontinuous in the predetermined second set and/or the set of PRACH sequence lengths. For example, the sizes of subsets may be different from or same as each other. FIG. 7 shows an example of configuring different subsets of the predetermined second set of values of subcarrier spacing and/or different PRACH sequence lengths for different use cases according to an embodiment of the present disclosure. As shown in FIG. 7, the predetermined second set 710 of values of subcarrier spacing are {1.25, 2.5, 5, 7.5, 15, 30, 60, 120} kHz. Two subsets 711-712 of the predetermined second set 710 are shown, in which the subset 711 may be {1.25, 2.5, 5, 7.5, 15, 30} kHz, and the subset 712 may be {15, 30, 60, 120} kHz. The subset 711 may be configured for case 713 (for example, initial access), while the subset 712 may be configured for case 714 (for example, beam fail report). For another example, the subset 711 may be configured for the case 713 (for example, initial access), while the subset 712 may be configured for the cases 713 and 714 (for example, initial access and beam fail report). Likewise, different PRACH sequence lengths may be configured for different use cases. For example, the PRACH sequence length of 839 may be configured for the case 713, while the PRACH sequence length of 63/71 or 127/139 may be used for the case 714. For another example, the PRACH sequence length of 893 may be configured for the case 713, and the PRACH sequence length of 63/71 or 127/139 may be used for the cases 713 and 714. In another embodiment, the subsets of the predetermined second set of values of subcarrier spacing and/or different PRACH sequence lengths may not be limited in the examples of FIG. 7.

In some embodiments, the network device 110 may indicate to the terminal device 120 a value $N_{TA}$ of timing advance, which is associated with one value of transmission subcarrier spacing $S_1$. The terminal device 120 may also support another value of transmission subcarrier spacing $S_2$. In this case, when the terminal device 120 is configured with the other value of transmission subcarrier spacing $S_2$ (for example, by the network device 110), the network device 110 may indicate to the terminal device another value $N_{TA}'$ of timing advance for the subcarrier spacing $S_2$. For example, the timing advance value may be independent for different transmissions of downlink and/or uplink and/or PRACH.

In some embodiments, the network device 110 may have indicated to the terminal device 120 a first value $N_{TA}$ of timing advance, which is associated with one value of transmission subcarrier spacing $S_1$. The terminal device 120 may also support another value of transmission subcarrier spacing $S_2$. In this case, when the terminal device 120 is configured with the other value of transmission subcarrier spacing $S_2$ (for example, by the network device 110), the terminal device 120 may determine a second value $N_{TA}'$ of timing advance based on the first index $N_{TA}$ and both of the values $S_1$ and $S_2$. For example, in one embodiment, the second value $N_{TA}'$ of timing advance may be determined as: $N_{TA}'=(S_2/S_1)*N_{TA}$. That is, the timing advance value can be referenced for some cases.

Figure 8A:
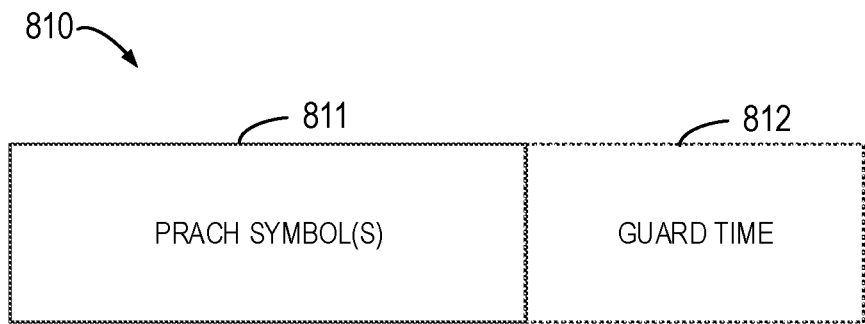
FIG. 8A-8B shows examples of PRACH transmission for beam failure report according to an embodiment of the present disclosure.
Figure 8B:
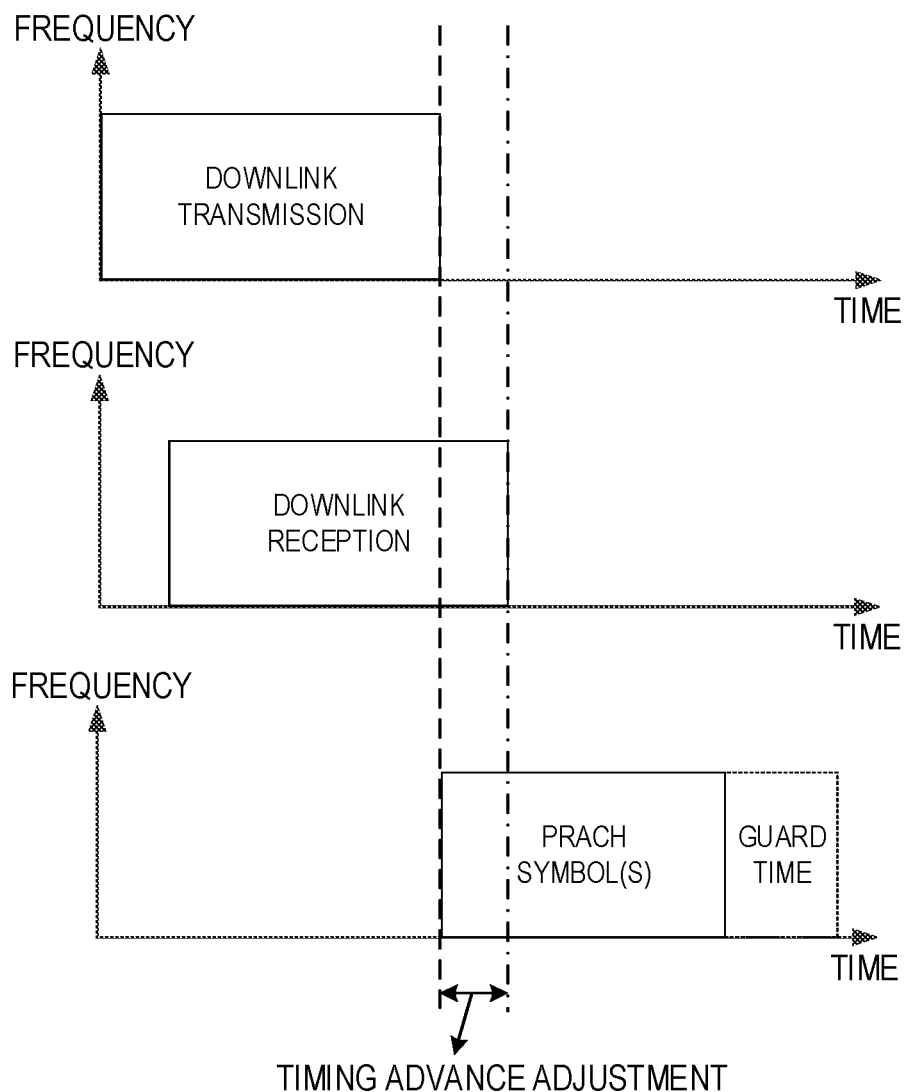

In some embodiments, the timing advance adjustment can be applied to beam fail report procedure. Upon detecting of beam failure, the terminal device 120 may transmit a specific PRACH sequence to the network device 110. In one embodiment, the specific PRACH sequence may refer to a specific sequence index or specific time and/or frequency resources. Upon reception of the specific PRACH sequence, the network device 110 may determine information on the beam failure based on the specific PRACH sequence. For the PRACH transmission for beam failure report, the timing advance adjustment can be applied. FIG. 8A-8B shows examples of PRACH transmission for beam failure report according to an embodiment of the present disclosure. As shown in FIG. 8A, a PRACH structure 810 for beam failure report may be provided, which may include one or more PRACH symbols 811 and a region 812 indicating a guard time. As shown in FIG. 8B, with the timing advance adjustment being applied to the PRACH transmission for beam failure report, the reception of PRACH at the network device 110 may be aligned. Further, the region for the guard time can be used for transmission of other information, such as information on the beam failure.

Figure 9:
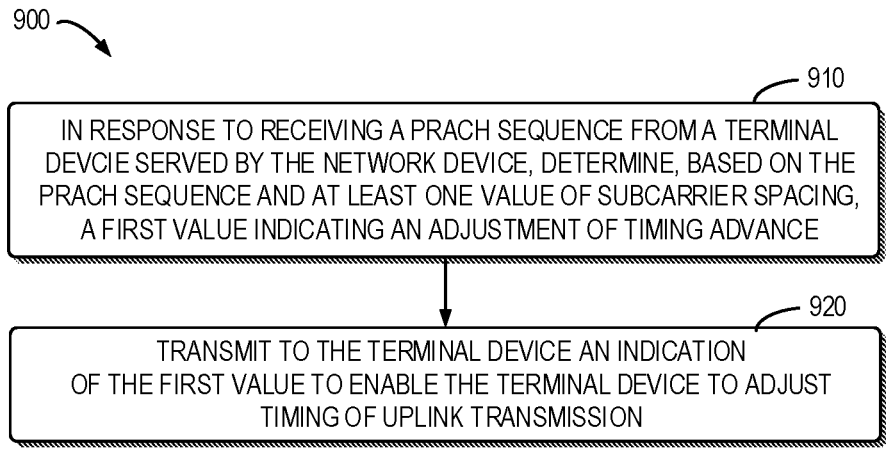
FIG. 9 shows a flowchart of an example method in accordance with some embodiments of the present disclosure.

FIG. 9 shows a flowchart of an example method 900 in accordance with some embodiments of the present disclosure. The method 900 can be implemented at a network device 110 as shown in FIG. 1. For the purpose of discussion, the method 900 will be described from the perspective of the network device 110 with reference to FIG. 1.

In act 910, in response to receiving a Physical Random Access Channel (PRACH) sequence from a terminal device served by the network device, the network device 110 determines, based on the PRACH sequence and at least one value of subcarrier spacing, a first value indicating an adjustment of timing advance.

In act 920, the network device 110 transmits to the terminal device an indication of the first value to enable the terminal device to adjust timing of uplink transmission.

In some embodiments, determining the first value comprises: determining a second value indicating a time interval between two adjacent samples in time domain; determining, based on the second value, a third value indicating a granularity for the adjustment of timing advance; and determining the first value based on the third value.

In some embodiments, determining the second value comprises: determining a reference value of subcarrier spacing; determining the number of samples in one symbol in the time domain; and determining the second value based on the reference value and the number of samples.

In some embodiments, the reference value includes a fixed value.

In some embodiments, determining the reference value comprises: determining a fourth value indicating transmission subcarrier spacing, the fourth value being included in a predetermined first set of values of subcarrier spacing; and determining the reference value based on the fourth value.

In some embodiments, the reference value includes the fourth value.

In some embodiments, the predetermined first set is divided into a first plurality of subsets, the fourth value is included in one of the first plurality of subsets, and determining the reference value comprises: determining the reference value based on the one of the first plurality of subsets.

In some embodiments, determining the third value comprises: determining a fourth value indicating transmission subcarrier spacing and a fifth value indicating subcarrier spacing for PRACH; and determining the third value based on the second, fourth and fifth values.

In some embodiments, the fifth value being included in a predetermined second set of values of subcarrier spacing, the predetermined second set is divided into a second plurality of subsets, the fifth value is included in one of the second plurality of subsets, and determining the fourth value comprises: determining the fourth value based on the one of the second plurality of subsets.

In some embodiments, determining the fourth and fifth values comprises: obtaining a predetermined second set of values of subcarrier spacing, the predetermined second set is divided into a second plurality of subsets; and determining at least one of the fourth and fifth value based on at least one of the second plurality of subsets.

In some embodiments, the method 900 further comprises: receiving, from the terminal device, a further sequence being transmitted with timing adjusted based on the first value by the terminal device.

Figure 10:
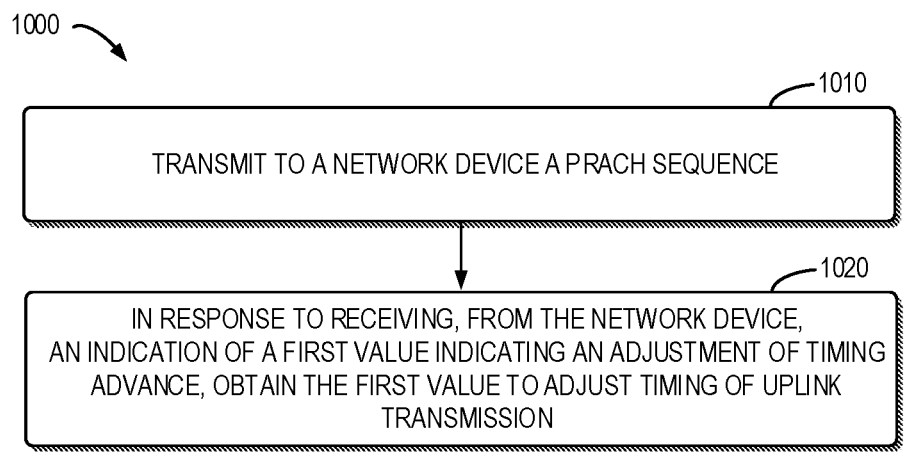
FIG. 10 shows a flowchart of an example method in accordance with some embodiments of the present disclosure.

FIG. 10 shows a flowchart of an example method 1000 in accordance with some embodiments of the present disclosure. The method 1000 can be implemented at a terminal device 120 as shown in FIG. 1. For the purpose of discussion, the method 1000 will be described from the perspective of the network device 110 with reference to FIG. 1.

In act 1010, the terminal device 120 transmits to a network device a Physical Random Access Channel (PRACH) sequence.

In act 1020, in response to receiving, from the network device, an indication of a first value indicating an adjustment of timing advance, the terminal device 120 obtains the first value to adjust timing of uplink transmission, the first value being determined by the network device based on the PRACH sequence and at least one value of subcarrier spacing.

In some embodiments, obtaining the first value comprises: determining a second value indicating a time interval between two adjacent samples in time domain; and determining the first value based on the indication and the second value.

In some embodiments, the method 1000 further comprises: transmitting, by adjusting the timing of the uplink transmission based on the first value, a further sequence to the network device.

In some embodiments, the network device may transmit to the terminal device configure information for PRACH transmission and/or timing advance adjustment. For example, the configuration information for the PRACH transmission may include at least one of the following: the value of subcarrier spacing of the PRACH sequence, the length of the PRACH sequence, the time and/or frequency resource, and etc. For example, the configuration information for timing advance adjustment may include at least one of the following: the time unit, the granularity of the timing advance adjustment, value of at least one parameter for the timing advance adjustment, the range of the value of the at least one parameter and/or number of bits for indicating the at least one parameter for the timing advance adjustment. For example, examples of the at least one parameter may include K and/or $N_{TA}$, and etc, as described above. In one embodiment, the network device may transmit the configuration information to the terminal device via higher layer signaling, dynamic signaling and/or physical layer signaling. Examples of the signaling may include but not limited to signaling on Radio Resource Control (RRC) Layer, Media Access Control (MAC) layer, and/or physical control layer, such as NR-PDCCH.

Figure 11:
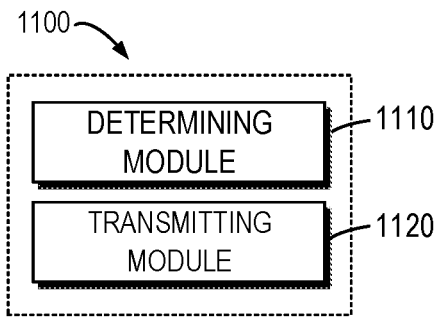
FIG. 11 is a block diagram of a network device in accordance with some embodiments of the present disclosure.

FIG. 11 shows a block diagram of an apparatus 1100 in accordance with some embodiments of the present disclosure. The apparatus 1100 can be considered as an example implementation of the network device 110 as shown in FIG. 1. As shown, the apparatus 1100 includes a determining module 1110 configured to, in response to receiving a Physical Random Access Channel (PRACH) sequence from a terminal device served by the network device, determine, based on the PRACH sequence and at least one value of subcarrier spacing, a first value indicating an adjustment of timing advance. The apparatus 1100 also includes a transmitting module 1120 configured to transmit to the terminal device an indication of the first value to enable the terminal device to adjust timing of uplink transmission.

Figure 12:
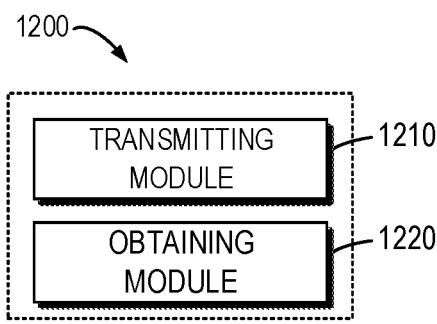
FIG. 12 is a block diagram of a terminal device in accordance with some embodiments of the present disclosure.

FIG. 12 shows a block diagram of an apparatus 1200 in accordance with some embodiments of the present disclosure. The apparatus 1200 can be considered as an example implementation of the terminal device 120 as shown in FIG. 1. As shown, the apparatus 1200 includes a transmitting module 1210 configured to transmit to a network device a Physical Random Access Channel (PRACH) sequence. The apparatus 1200 also includes a obtaining module 1220 configured to, in response to receiving, from the network device, an indication of a first value indicating an adjustment of timing advance, obtain the first value to adjust timing of uplink transmission, the first value being determined by the network device based on the PRACH sequence and at least one value of subcarrier spacing.

For the sake of clarity, FIG. 11 and/or 12 do not illustrate some optional modules of the apparatuses 1100 and/or 1200. However, it should be understood that various features as described with reference to FIGS. 1-9 are likewise applicable to the apparatuses 1100 and various features as described with reference to FIGS. 1-8 and 10 are likewise applicable to the apparatuses 1200. Moreover, respective modules of the apparatuses 1100 and/or 1200 may be hardware modules or software modules. For example, in some embodiments, the apparatuses 1100 and/or 1200 may be implemented partially or completely by software and/or firmware, e.g., implemented as a computer program product embodied on the computer-readable medium. Alternatively, or in addition, the apparatuses 1100 and/or 1200 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 13:
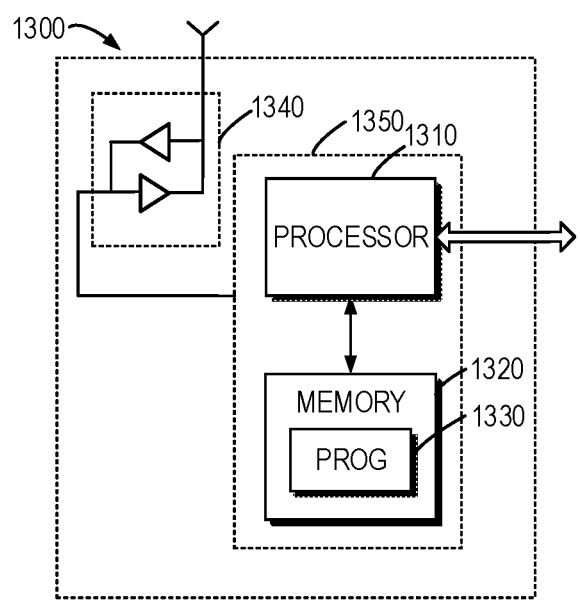
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of a network device 110 or a terminal device 120 as shown in FIG. 1. Accordingly, the device 1300 can be implemented at or as at least a part of the network device 110 or the terminal device 120.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1310 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1330 is assumed to include program instructions that, when executed by the associated processor 1310, enable the device 1300 to operate in accordance with the embodiments of the present disclosure, as discussed herein with reference to FIGS. 1 to 11. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1310 may form processing means 1350 adapted to implement various embodiments of the present disclosure.

The memory 1310 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1310 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal comprising a processor configured to:
transmit a PRACH (Physical Random Access Channel) sequence to the network device; then
receive a timing advance command in a Random Access Response indicating X from the network device; and
start transmitting an uplink frame a period of time before start of a downlink frame corresponding to the uplink frame, wherein
the period of time is {(the X+Y) *Z}, where
the X is inversely proportional to a value of subcarrier spacing,
the Y represents a fixed offset value, and
the Z represents a basic time unit, wherein
the value of subcarrier spacing is one of {120, 240} kHz.

2. The terminal according to claim 1, wherein
the value of subcarrier spacing is one of {15, 30, 60, 120, 240} kHz.

3. The terminal according to claim 1, wherein
(the X *the Z) is a multiple of (240 *a basic time unit for LTE).

4. A network device comprising a processor configured to:
receive a PRACH (Physical Random Access Channel) sequence from a terminal; then
transmit a timing advance command in a Random Access Response indicating X to the terminal; and
receive an uplink frame transmission being started a period of time before start of a downlink frame corresponding to the uplink frame by the terminal, wherein
the period of time is {(the X+Y) *Z}, where
the X is inversely proportional to a value of subcarrier spacing,
the Y represents a fixed offset value, and
the Z represents a basic time unit, wherein
the value of subcarrier spacing is one of {120, 240} kHz.

5. The network device according to claim 4, wherein
the value of subcarrier spacing is one of {15, 30, 60, 120, 240} kHz.

6. The network device according to claim 4, wherein
(the X *the Z) is a multiple of (240 *a basic time unit for LTE).

7. A method comprising:
transmitting a PRACH (Physical Random Access Channel) sequence; then
receiving a timing advance command in a Random Access Response indicating X; and starting transmitting an uplink frame a period of time before start of a downlink frame corresponding to the uplink frame, wherein
the period of time is {(the X+Y) *Z}, where
the X is inversely proportional to a value of subcarrier spacing,
the Y represents a fixed offset value, and
the Z represents a basic time unit, wherein
the value of subcarrier spacing is one of {120, 240} kHz.

8. The method according to claim 7, wherein the value of subcarrier spacing is one of {15, 30, 60, 120, 240} kHz.

9. The method according to claim 7, wherein (the X *the Z) is a multiple of (240 *a basic time unit for LTE).

10. A method comprising:
receiving a PRACH (Physical Random Access Channel) sequence; then
transmitting a timing advance command in a Random Access Response indicating X; and
receiving an uplink frame transmission being started a period of time before start of a downlink frame corresponding to the uplink frame, wherein
the period of time is {(the X+Y) *Z}, where
the X is inversely proportional to a value of subcarrier spacing,
the Y represents a fixed offset value, and
the Z represents a basic time unit, wherein
the value of subcarrier spacing is one of {120, 240} kHz.

11. The method according to claim 10, wherein the value of subcarrier spacing is one of {15, 30, 60, 120, 240} kHz.

12. The method according to claim 10, wherein (the X *the Z) is a multiple of (240 *a basic time unit for LTE).

\* \* \* \* \*